(12) United States Patent
Hall et al.

(10) Patent No.: US 7,054,292 B2
(45) Date of Patent: May 30, 2006

(54) HYBRID SYNCHRONOUS SPACE/CODE MULTIPLE ACCESS SYSTEM USING AN ADAPTIVE ANTENNA SYSTEM

(75) Inventors: Eric K. Hall, Holliday, UT (US); Thomas R. Giallorenzi, Riverton, UT (US); Richard B. Ertel, Midvale, UT (US); Christian Schlegel, Park City, UT (US); Zachary Bagley, Salt Lake City, UT (US)

(73) Assignee: L-3 Communications Corporation, New York, NY (US)

( * ) Notice: Subject to any disclaimer, the term of this patent is extended or adjusted under 35 U.S.C. 154(b) by 898 days.

(21) Appl. No.: 09/833,720

(22) Filed: Apr. 12, 2001

(65) Prior Publication Data

US 2002/0071384 A1 Jun. 13, 2002

Related U.S. Application Data

(60) Provisional application No. 60/243,808, filed on Oct. 27, 2000.

(51) Int. Cl.
*H04B 7/216* (2006.01)

(52) U.S. Cl. ............... 370/334; 370/335; 370/342; 375/141; 455/562.1

(58) Field of Classification Search ............... 370/334, 370/335, 342; 375/140, 141, 146; 455/561, 455/562.1

See application file for complete search history.

(56) References Cited

U.S. PATENT DOCUMENTS

| | | | | |
|---|---|---|---|---|
| 5,260,968 A | * | 11/1993 | Gardner et al. | 375/347 |
| 5,936,569 A | | 8/1999 | Stahle et al. | 342/174 |
| 6,073,032 A | | 6/2000 | Keskitalo et al. | 455/561 |
| 6,212,406 B1 | | 4/2001 | Keskitalo et al. | 455/562 |
| 6,229,796 B1 | * | 5/2001 | Dent | 370/335 |
| 6,347,234 B1 | * | 2/2002 | Scherzer | 455/562.1 |
| 6,353,601 B1 | | 3/2002 | Siira | 370/331 |
| 6,370,129 B1 | * | 4/2002 | Huang | 370/329 |
| 6,385,181 B1 | * | 5/2002 | Tsutsui et al. | 370/335 |
| 6,477,161 B1 | * | 11/2002 | Hudson et al. | 370/342 |

* cited by examiner

*Primary Examiner*—Ricky Q. Ngo
*Assistant Examiner*—Richard Chang
(74) *Attorney, Agent, or Firm*—Harrington & Smith, LLP

(57) ABSTRACT

A method is disclosed for operating a synchronous space division multiple access, code division multiple access communications system. The method includes steps of, within a coverage area of a base station (BS), (a) assigning the same spreading code to a plurality of subscriber stations (SSs); and (b) beamforming using an antenna array at the BS so as to maximize the signal to interference plus noise ratio for a signal transmitted from a desired SS, The beamforming operates to steer a null towards another same-code SS to minimize interference from the same-code SS. Assuming that the antenna array has M-elements (M>1), then individual ones of P orthogonal spreading codes can be reused $\alpha M$ times within the coverage area, where $1/M < \alpha \leq 1$. The step of beamforming includes an initial step of despreading the signal received from the desired SS, followed by a step of spatial filtering.

9 Claims, 6 Drawing Sheets

WIRELESS ACCESS REFERENCE MODEL

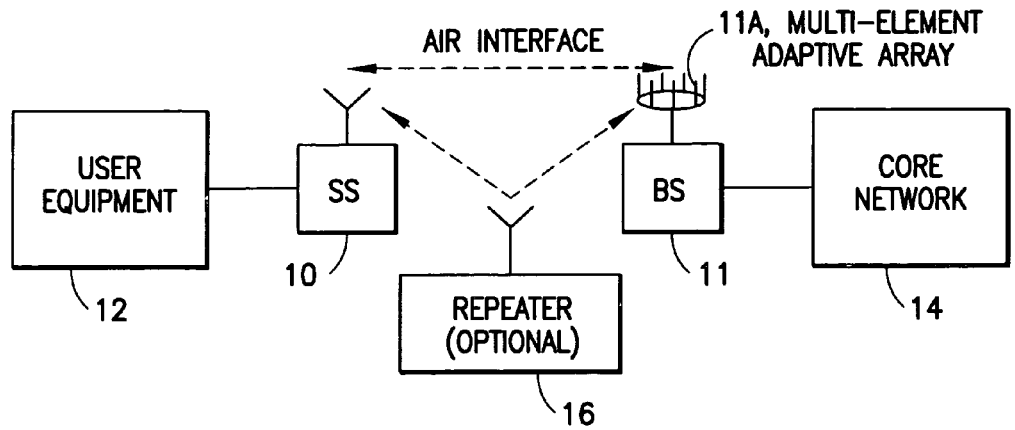
FIG. 1  WIRELESS ACCESS REFERENCE MODEL
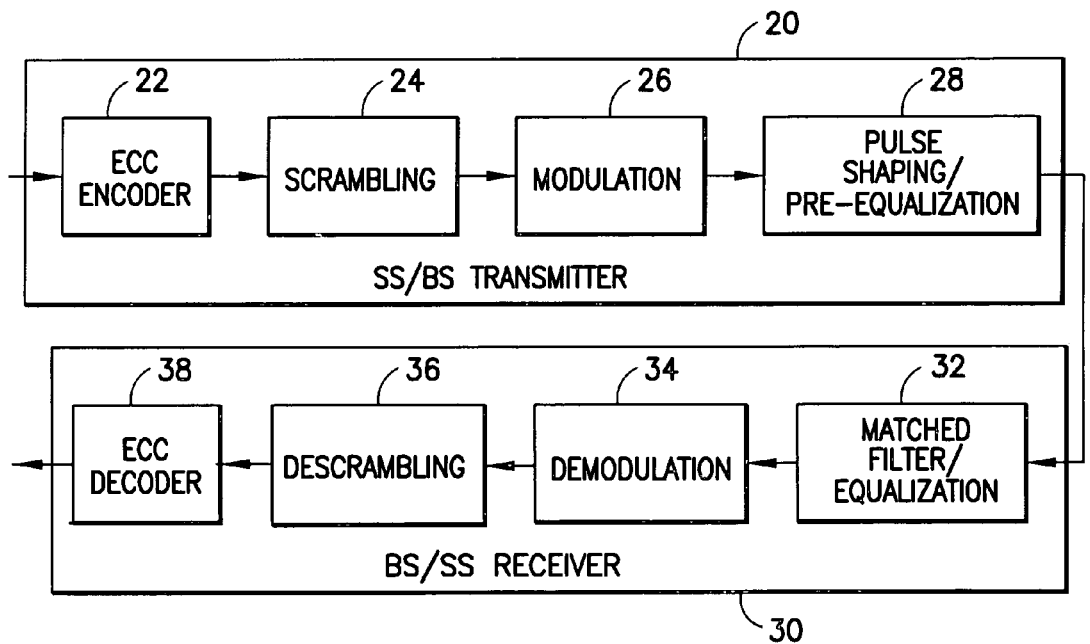
FIG. 2  PHY REFERENCE MODEL SHOWING DATA FLOW
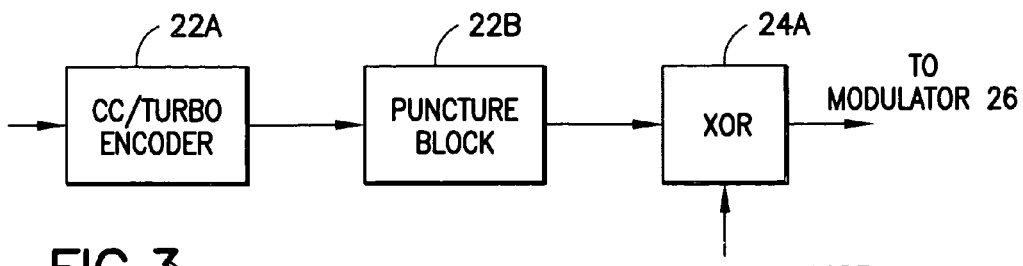
FIG. 3

| PARAMETER | MODULATION AND CHANNEL CODING | | |
|---|---|---|---|
| | QPSK w/R=4/5 CODING (1.6 BITS/SYM) | 16-QAM w/R=4/5 CODING (3.2 BITS/SYM) | 64-QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG. 4  HYPOTHETICAL PARAMETERS FOR A 3.5 MHz RF CHANNELIZATION

| NUMBER OF ELEMENTS | QPSK | | 16 QAM | | 64 QAM | |
|---|---|---|---|---|---|---|
| | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG. 5  AGGREGATE CAPACITY AND MODULATION FACTORS VERSUS MODULATION TYPE AND ARRAY SIZE

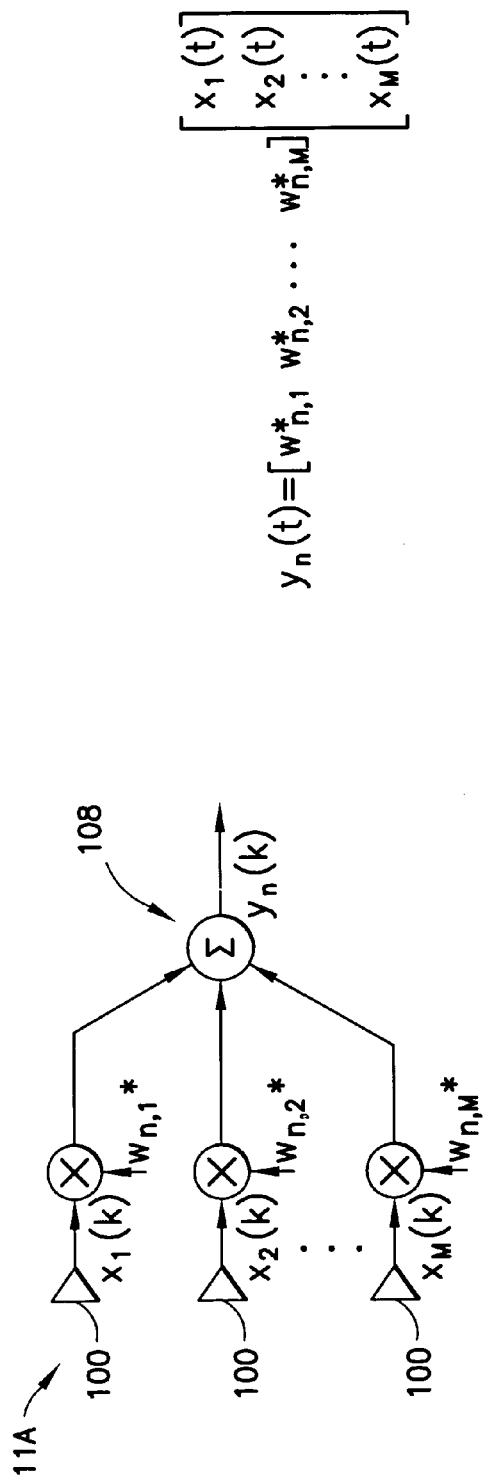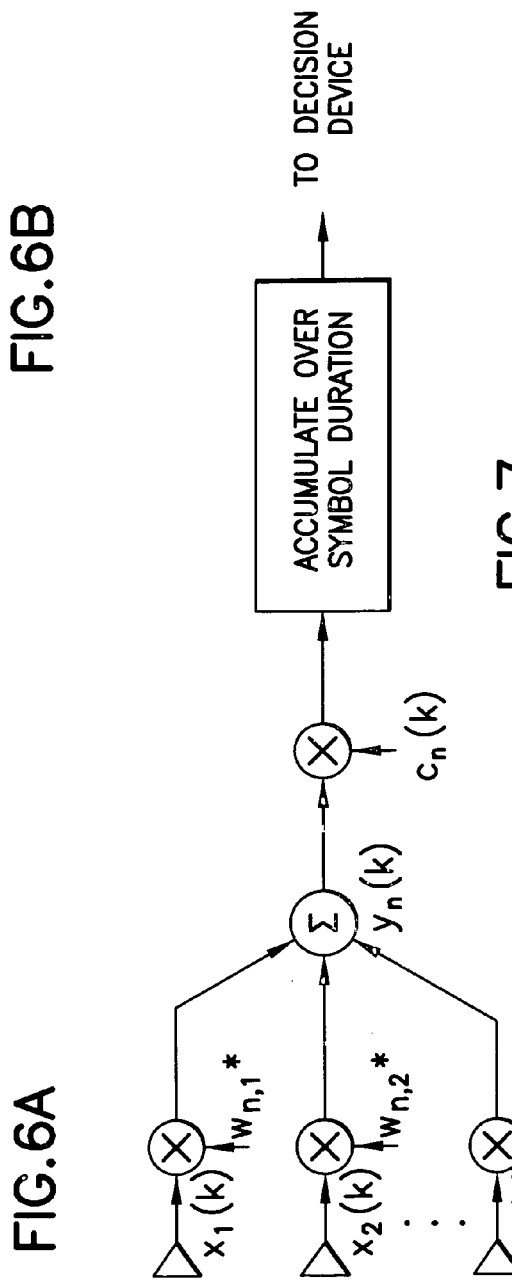
FIG. 6A
FIG. 6B
$$y_n(t) = [w_{n,1}^* \; w_{n,2}^* \; \cdots \; w_{n,M}^*] \begin{bmatrix} x_1(t) \\ x_2(t) \\ \vdots \\ x_M(t) \end{bmatrix}$$
FIG. 7
PRIOR ART

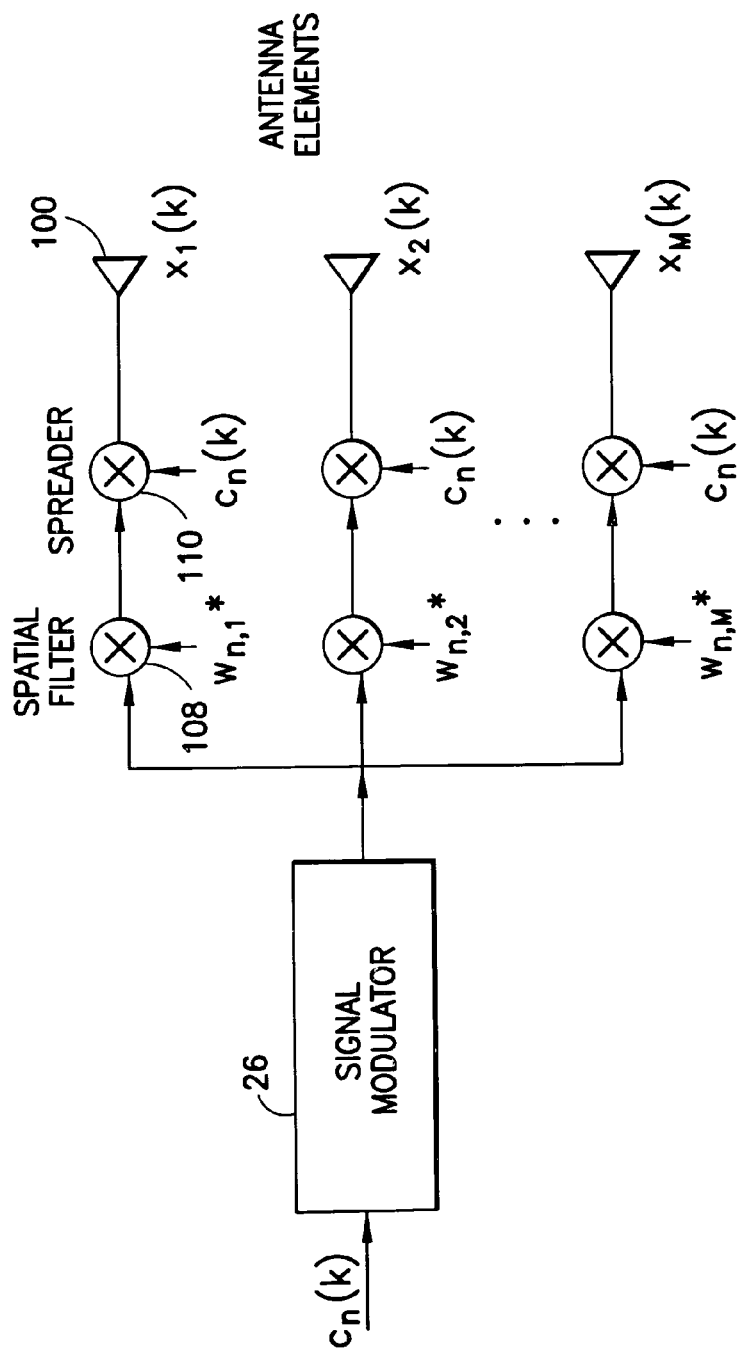

HYBRID SYNCHRONOUS SPACE/CODE MULTIPLE ACCESS SYSTEM USING AN ADAPTIVE ANTENNA SYSTEM

CLAIM OF PRIORITY FROM COPENDING PROVISIONAL PATENT APPLICATIONS

This patent application claims priority from U.S. Provisional Patent Application No.: 60/243,808, filed on Oct. 27, 2000, the disclosure of which is incorporated by reference herein in its entirety.

FIELD OF THE INVENTION

These teachings relate generally to wireless communications systems and methods, and relates in particular to base station antenna implementations for Synchronous Code Division Multiple Access (S-CDMA) systems.

BACKGROUND OF THE INVENTION

In a synchronous direct-sequence code division multiple access (S-CDMA) system, users communicate simultaneously using the same frequency band via orthogonal modulation or spread spectrum. The number of orthogonal spreading codes (>1) limits the total capacity of the system. To increase the capacity of a CDMA system in a given service area, without requiring additional frequency bandwidth, space division multiple access (SDMA) can be employed.

Sectorization is the most common approach to providing space division multiple access (SDMA). Simply stated, sectorization splits the coverage area into multiple sectors, with each sector being serviced by independent antenna beams.

A SDMA/CDMA system employing sectorization has a user capacity that scales linearly with the number of sectors, but requires users along sector boundaries to be frequency isolated and, thus, additional frequency bandwidth is needed. That is, frequency division is typically employed along the adjacent sector boundaries, which requires additional frequency spectrum. Sectorization also suffers from decreased Erlang efficiency due to the limited capacity per sector. That is, the total supported traffic of a sectored cell is equal to the sum of the supported traffic in the individual sectors. However, the sum of the supported sector traffic is typically much less than could be supported in a cell with the same total number of channels, but with no sector constraints. As an example, a system with P=16 channels per sector and M=4 sectors can support 100 users per sector, or a total of 400 users per cell, assuming that GOS=0.02 and a traffic density of 0.1 Erlangs. A system with the same number of total channels (MP=64), but with no sector constraints, can support approximately 550 users under same assumptions. As such, since sectorization places restrictions on the locations of users, it is not the most efficient approach to supporting communications within a given area.

The concepts of SDMA and adaptive antennas has been actively researched. The use of SDMA and adaptive antenna systems in the context of CDMA has also been investigated. For example, reference can be had to "Smart Antennas for Wireless Communications: IS-95 & Third Generation CDMA Applications", by J. C. Liberti and T. S. Rappaport, Prentice Hall, 1999. However, this text deals primarily with mobile CDMA applications, where smart antenna systems are used to provide isolation in asynchronous or quasi-synchronous CDMA systems. The text suggests nulling interfering users (interferers), but does not suggest that the interferers have the same CDMA spreading code for providing increased system capacity.

The use of antenna systems in conjunction with CDMA is also considered in U.S. Pat. No.: 4,901,307. In this patent antenna systems are used to point directive beams or to create interference patterns of "maximum signal to noise" at a given receiver location, and requires knowledge of the receiver location or the physical channel between the transmitter and the receiver. This patent also does not consider the S-CDMA case, nor the possibility of reusing the orthogonal spreading codes within the same coverage area.

SUMMARY OF THE INVENTION

In accordance with an aspect of these teachings, antenna patterns are provided so as to minimize the interference from other CDMA users by using adaptive beamforming at the receiver, thereby maximizing the signal to interference plus noise ratio. The preferred beamforming approach adapts to the interference pattern created by all users, rather than using knowledge of the receiver location.

A method is disclosed for operating a synchronous space division multiple access, code division multiple access communications system. The method includes steps of, within a coverage area of a base station (BS), (a) assigning the same spreading code to a plurality of subscriber stations (SSs); and (b) beamforming using an antenna array at the BS so as to maximize the signal to interference plus noise ratio for a signal transmitted from a desired SS, The beamforming operates to steer a null towards another same-code SS to minimize interference from the same-code SS. Assuming that the antenna array has M-elements (M>1), then individual ones of P orthogonal spreading codes can be reused $\alpha M$ times within the coverage area, where $1/M < \alpha \leq 1$. The step of beamforming includes an initial step of despreading the signal received from the desired SS, followed by a step of spatial filtering.

The step of beamforming includes steps of operating the subscriber stations to obtain channel estimates comprised of the path amplitude and phase from each of m BS antenna elements and sending the m channel estimates back to the BS as a spatial signature vector. The BS is responsive to the spatial signature vectors received from a plurality of same-code subscriber stations for computing antenna element weight vectors.

Further in accordance with these teachings there is provided a synchronous space division multiple access, code division multiple access communications system having a base station with a coverage area and a set of subscriber stations disposed within the coverage area. The base station includes an adaptive antenna array for receiving transmissions from the set of subscriber stations and for transmitting signals to the set of subscriber stations. A subset of the subscriber stations are a plurality of same-code subscriber stations that are assigned an identical spreading code. The base station includes beamforming circuitry coupled to the adaptive antenna array for maximizing the signal to interference plus noise ratio for a signal transmitted from one of the same-code subscriber stations by steering a null towards others of the same code same-code subscriber stations to minimize interference from the others of the same-code subscriber stations.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 1 is simplified block diagram of a wireless access reference model that pertains to these teachings;

FIG. 2 is block diagram of a physical (PHY) system reference model showing a major data flow path;

FIG. 3 shows an Error Control Coding (ECC) and scrambling technique for single CDMA channel;

FIG. 4 is a Table illustrating exemplary parameters for a 3.5 MHz RF channelization;

FIG. 5 is a Table depicting an aggregate capacity and modulation factors versus modulation type and antenna array size (number of elements);

FIG. 6A is diagram of a spatial filter used in SDMA antenna beamforming;

FIG. 6B is a mathematical expression describing the operation of the spatial filter of FIG. 6A;

FIG. 7 depicts a prior art SDMA/CDMA receiver wherein spatial filtering is performed prior to despreading;

FIG. 9 illustrates a preferred SDMA/CDMA transmitter structure for the case of a single user; and FIG. 10 depicts a complex signal vector, also referred to as a spatial signature vector, that is used when updating a path estimate to a single subscriber station.

DETAILED DESCRIPTION OF THE PREFERRED EMBODIMENTS

Figure 8:
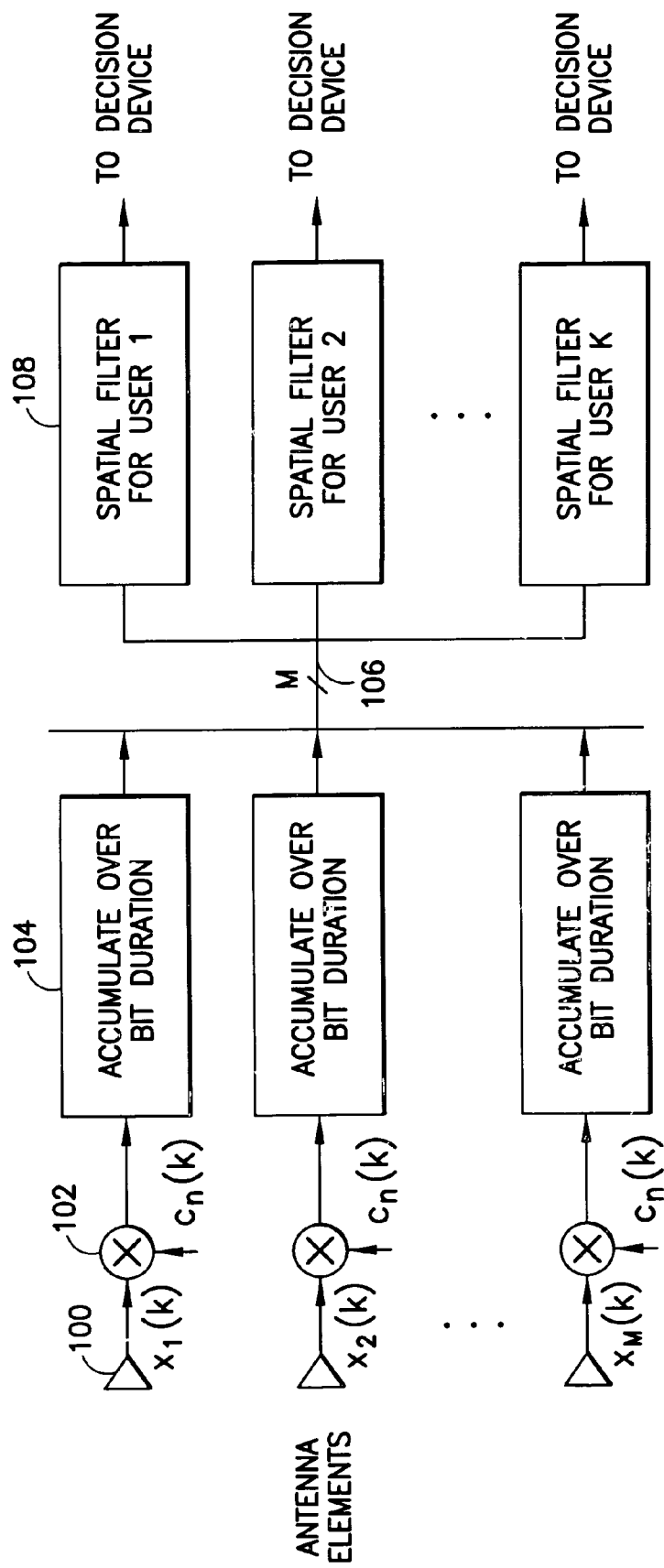
FIG. 8 illustrates a preferred SDMA/CDMA receiver, wherein spatial filtering is performed after despreading.

Disclosed herein is a PHY system intended for IEEE 802.16.3 and related standards, although those having skill in the art should realize that various aspects of these teachings have wider applicability.

The technique is based on a hybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, "Bandlimited Quasi-Synchronous CDMA: A Novel Satellite Access Technique for Mobile and Personal Communication Systems," IEEE Journal on Selected Areas in Communications, Vol. 10, No. 2, February 1992, pp. 328–343, and to R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings in accordance with these teachings.

The system provides synchronous direct-sequence code division multiple access (DS-CDMA) for both upstream and downstream transmissions. The system further provides spread RF channel bandwidths from 1.75–7 MHz , depending on target frequency band, and a constant chip rate from 1–6 Mcps (Million chips per second)within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system S-CDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QPSK and 16-QAM modulation with optional support for 64-QAM. End-to-end raised-cosine Nyquist pulse shape filtering is employed, as is adaptive coding, using high-rate punctured, convolutional coding (K=7) and/ or Turbo coding (rates of 4/5, 5/6 and 7/8 are typical). Data randomization using spreading code sequences is employed, as is linear equalization in the downstream with possible transmit pre-equalization for the upstream.

As will be described more fully below, also featured is the use of space division multiple access (SDMA) using adaptive beam-forming antenna arrays (e.g., 1 to 16 elements) at the base station.

FIG. 1 shows the wireless access reference model per the IEEE 802.16.3 FRD (see IEEE 802.16.3–00/02r4, "Functional Requirements for the 802.16.3 Interoperability Standard."). Within this model, the PHY technique in accordance with these teachings provides access between one or more subscriber stations (SS) 10 and base stations (BS) 11 to support the user equipment 12 and core network 14 interface requirements. An optional repeater 16 may be deployed. In the preferred embodiment the BS 11 includes a multi-element adaptive array antenna 11A, as will be described in detail below.

In FIG. 2, the PHY reference model is shown. This reference model is useful in discussing the various aspects of the PHY technique. As is apparent, the SS 10 and BS transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/ equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11

GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz., the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach, a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16.3 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separation range from 50 to 200 MHz.

Turning now to the Synchronous DS-CDMA (S-DS/CDMA) aspects of these teachings, within each FDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs, with spread factors ranging from 1 up to 128 chips per symbol (see, for example, E. Dinan and G. Jabbari, "Spreading Codes for Direct Sequence CDMA and Wideband CDMA Cellular Networks," IEEE Communications Magazine, September 1998, pp. 48–54. For multi-cell deployments with low frequency reuse, unique spreading code sets are used in adjacent cells to minimize interference.

An aspect of the preferred system embodiment is a symmetric waveform within each FDMA sub-channel, where both the upstream and downstream utilize the same chipping rate (and RF channel bandwidth), spreading code sets, modulation, channel coding, pulse shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDM/CDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially "circuit-switched" CDM channels would enable better support of legacy circuit-switched voice communications equipment and public switched telephone networks.

For the upstream, the preferred embodiment employs a similar partition of TDM/CDM channels. The TDM channel(s) are used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists which implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beamforming antennas. Reference can be made to J. Liberti and T. Rappaport, Smart Antennas for Wireless CDMA, Prentice-Hall PTR, Upper Saddle River, N.J., 1997, for details of beamforming with CDMA systems.

In accordance with an aspect of the teachings herein, there is provided the adaptive antenna array 11A at the BS 11, with fixed beam SS antennas. In this approach, S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to the SS 10 based on need, or on SLAs. Once allocated, the BS 11 forms a beam to the SS 10 to maximize signal-to-interference ratios. Once the beam is formed, the BS 11 may allocate the same CDMA channel to one or more other SSs 10 in the cell. It is theoretically possible for the spectral efficiency of the cell to scale linearly with the number of antennas in the BS array 11A.

SDMA greatly favors the approach of "fast circuit-switching" over pure, TDM packet-switching in a CDMA environment. By "fast circuit-switching", what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate ½, constraint length 7 code with generator $(133/171)_8$. Puncturing is used to increase the rate of the code, with rates of 3/4, 4/5, 5/6 or 7/8 supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409, for an analysis of trellis-coded S-CDMA.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing code.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, de-randomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using QPSK waveform provided adequate SNR. In environments with higher SNR, up and downstream links may utilize 16-QAM and /or 64-QAM modulation formats for increased capacity and spectral efficiency. The allowable modulation format depends on the channel conditions and the channel coding being employed on the link.

In the preferred embodiment, end-to-end raised-cosine Nyquist pulse shaping is applied by block 28 of FIG. 2, using a minimum roll-off factor of 0.25. Pulse shape filtering is designed to meet relevant spectral masks, mitigate intersymbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 μs is expected for Non-Line Of Sight (NLOS) deployments using narrow-beam (10–20°) subscriber station 10 antennas (see, for example, J. Porter and J. Thweat, "Microwave Propagation Characteristics in the MMDS Frequency Band," Proceedings of IEEE International Conf. On Communications (ICC) 2000, New Orleans, La., USA, June 2000, and V. Erceg, et al, "A Model for the Multipath Delay Profile of Fixed Wireless Channels," IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station 10 due to frequency division duplexing.

Timing control is required for S-CDMA. In the downstream, timing control is trivial. However, in the upstream timing control is under the direction of the BS 11. Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference (see, for example, T. Rappaport, *Wireless Communications: Principles and Practice*, Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note, mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g. 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multi-cell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS 10 antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is required to mitigate the interference contributed by users on sector boundaries. In light of this reuse issue, it is preferred to use SDMA with adaptive beamforming, rather than sectorization, to improve cell capacity, as will be discussed in detail below.

Since spectral efficiency translates directly into cost, the possibility of a frequency reuse of one is an important consideration.

The use of SDMA in conjunction with S-CDMA offers the ability to dramatically increase system capacity and spectral efficiency. SDMA uses the antenna array 11A at the BS 11 to spatially isolate same code SSs 10 in the cell. The number of times that a code may be reused within the same cell is dependent upon the number of antenna elements in the array 11A, the array geometry, the distribution of users in the cell, the stability of the channel, and the available processing power. Theoretically, in the absence of noise, with an M element antenna array 11A it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements of the antenna array 11A is limited by the available processing power, the physical tower constraints, and system cost (e.g. the number of additional RF front ends (RFFEs)).

Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64 QAM and a sixteen-element antenna array 11A. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling non-contiguous frequency allocations. The data multiplexing scheme allows great flexibility in servicing traffic asymmetry and support of traffic patterns created by higher-layer protocols such as TCP.

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using the adaptive antenna array 11A and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrowband jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array 11A used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array 11A used to implement SDMA also functions as a diversity combiner. Assuming independent fading on each antenna element, diversity gains of M are achieved, where M is equal to the number of antenna elements in the antenna array 11A. Finally, since the S-CDMA system is code-limited rather than interference limited, the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY is quite different from cable modem and xDSL industry standards, as well as existing IEEE 802.11 standards. With a spreading factor of one chip/symbol, the PHY supports a single-carrier QAM waveform similar to DOCSIS 1.1 and IEEE 802.16.1 draft PHY (see "Data-Over-Cable Service Interface Specifications: Radio Frequency interface Specification", SP-RF1v1.1I-05-000714, and IEEE 802.16.1-00/01r4, "Air Interface for Fixed Broadband Wireless Access Systems", September 2000.

The presently preferred PHY technique provides an optimum choice for IEEE 802.16.3 and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include:

High spectral efficiency (1–6 bps/Hz system-wide), even without SDMA;

Compatibility with smart antennas (SDMA), with system-wide spectral efficiency exceeding 20 bps/Hz possible; and A frequency reuse of one is possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS 11 hardware.

Having thus described the overall PHY system, a discussion will now be provided in greater detail of an aspect thereof that is particularly pertinent to these teachings.

To increase the capacity of an S-CDMA system, without bandwidth expansion and loss of Erlang efficiency, the teachings of herein employ the SDMA technique that is based on the use of an adaptive beamforming antenna. The preferred implementation is a hybrid synchronous SDMA/CDMA system employing an M-element (M>1) adaptive antenna array 11A, wherein individual ones of P orthogonal spreading codes are reused $\alpha M$ times, where $1/M < \alpha \leq 1$, giving a maximum system capacity of $\alpha MP$ channels. As an example, $\alpha$ may have a value in the range of about 0.9 to about 0.99. Due to the employment of synchronous CDMA (S-CDMA), a given user is isolated from the $\alpha M(P-1)$ different-code users by orthogonal spreading codes. The same user is isolated from the $\alpha M-1$ same code users by adaptive beamforming that creates a unique antenna pattern for the user, and that acts to suppress the same-code interference by steering antenna nulls in the directions of the same-code interfering users. At a high level, the extraction of the user's information is a two stage process, whereby code filtering (or despreading) is followed by spatial filtering.

Unlike a sectorized approach that employs fixed beam antennas, the users in the hybrid SDMA/CMDA system with adaptive antennas may be distributed arbitrarily in the coverage area, thereby allowing for concentration and greater Erlang efficiency, provided the antenna array aperture is sufficiently large.

A purpose of this hybrid SDMA/CMDA approach is to increase the capacity of a code-limited, synchronous direct-sequence CDMA (S-DS/CDMA) system, without requiring additional frequency bandwidth using space division multiple access (SDMA). This is accomplished by using the M-element antenna array 11A at the BS 11 to create $\alpha M$ spatially isolated channels for each spreading code in the CDMA system, allowing each spreading code to be reused $\alpha M$ times within a given area, where $1/M \leq \alpha \leq 1$. The system can support up to $\alpha MP$ simultaneous CDMA users, where P is the spreading factor of the CDMA system, without the need to provide additional frequency bandwidth. The complexity of the implementation is modest, and scales with the number of antenna elements in the adaptive antenna array 11A.

Several hybrid SDMA/CDMA schemes have been proposed and developed in the prior art. These teachings provide a technique that is based on a combination of synchronous direct-sequence CDMA (S-DS/CDMA), in conjunction with SDMA provided by adaptive beamforming. Conventional hybrid SDMA/CDMA systems are typically asynchronous, and rely on random spreading codes and directed beam patterns for providing isolation between users. In accordance with an aspect of these teachings, orthogonal spreading codes are reused within a given area. Isolation between different code users is obtained by the synchronous nature of the communications system and the orthogonality of the spreading codes. Unlike other SDMA approaches, adaptive beam forming is employed to isolate the same-code users at the plurality of SSs 10. Users having the same spreading code are isolated spatially by steering nulls in the direction of interfering users, rather than directing a beam in the direction of the user(s) of interest. This is significantly different than conventional approaches, which direct a beam at a user of interest, rather than cancelling interference. In accordance with an aspect of these teachings, the signal-to-noise ratio of the user is improved by a minimization of interference, rather than a maximization of the desired signal strength.

The use of these teachings provides for a linear scaling of the system capacity of a code-limited, S-CDMA system without requiring additional frequency bandwidth or a loss of Erlang efficiency. By coupling S-CDMA with SDMA, the total system capacity is $\alpha MP$, where M is the number of antennas, P is the spreading factor of the CDMA system (also the code-limited capacity of a single-antenna system), and $\alpha$ is a constant with $1/M < \alpha < 1$. The geometry of the antenna array 11A may vary, with a circular array being preferred, where the antenna elements are directional or omni-directional. Reusing orthogonal spreading codes in a synchronous CDMA system implies that different code users already experience large isolation, enabling the SDMA to focus on isolating the same-code users. For SDMA, adaptive beamforming antennas have significant advantages over the use of sectorization or beamsteering. Beamforming provides greater isolation and effective signal-to-noise ratios versus beamsteering. Beamforming also avoids the problems of frequency reuse and Erlang inefficiency found in sectorized antenna SDMA systems, where large antenna aperture antenna arrays are used.

These teachings thus provide a multiple access communications system that combines orthogonal S-CDMA with SDMA. The BS 11 includes an M>1 element antenna array 11A for servicing a plurality of the SS 10 each having, preferably, a single directional antenna. The BS 11 and the plurality of SSs10 coexist in defined area or cell, and communicate using orthogonal S-DS/CDMA with frequency division duplexing (FDD). Assuming a single BS 11 antenna 11A (M=1), the total number of channels in the system is equal to the number of orthogonal spreading codes P.

To achieve proper spatial filtering of the user's signals for same-code interference suppression, the SSs 10 require some spatial separation. However, the required spatial separation is typically much less restrictive than for the conventional sectored approach. For example, users separated by as little as one degree in angle of arrival from the desired user can be sufficiently suppressed using the adaptive beamforming technique, with a sufficiently large antenna aperture. In this sense, the users can be spaced apart (almost) arbitrarily throughout the cell. This allows greater Erlang efficiency as compared to conventional sectorization. The tradeoff is the increased complexity of the beamforming algorithms at the BS 11.

In the forward link, the base station antenna array 11A transmits the signal of interest in the direction of the desired user, while at the same time minimizing the energy of same-code users transmitted in the direction of the desired user. Similar to the reverse link, user data is first spatially filtered using a weight vector for the user of interest. Each of M spatial filter outputs are modulated using the same orthogonal spreading waveform and transmitted using one of M antenna elements of the array 11A. Since the link is a FDD link, the forward link is computed independently from the reverse link spatial filter for all users. At the SS 10, a single directional antenna can be used to capture the transmitted signal, plus interference, and then the received signal is despread to recover the user data. In this fashion, signal processing in the SS 10 suppresses the interference from different-code users, and relies solely on the spatial filter of the BS 11 transmitter to suppress the received interference from the same-code users.

The hybrid synchronous space code division multiple access system using the adaptive BS 11 antenna 11A allows the number of channels per cell to scale linearly with the number of antenna elements, with minimal spatial separation between users. To limit cost and complexity, all adaptive beamforming is performed at the BS 11, and thus places no additional computational burden on the on the SS 10.

An efficient implementation of SDMA is now described for use with S-CDMA. As was discussed above, the receiver and transmitter structures employ the antenna array 11A with M antenna elements. In the S-CDMA system, several different orthogonal CDMA codes are assigned to the BS 11. Using closed loop feedback from the BS 11, each CDMA code transmitted on the reverse link from the SSs 10 is code aligned (synchronized) such the orthogonality of the code sequences is preserved. The number of available orthogonal codes for a given spreading factor is limited, and therefore the capacity of the conventional S-CDMA system is often code limited. However, when SDMA is used in conjunction with S-CDMA, it becomes possible to reuse each code sequence up to M times. In practice, the number of available antenna elements to provide an SDMA code reuse of M is greater than M due to implementation loss, frequency selective multipath fading and receiver noise. Regardless, significant capacity gains are achievable with SDMA.

SDMA is achieved in the instant S-CDMA system by exploiting the differences in the spatial signature vectors of the various users in the cell. Conceptually, in a non-multipath channel it may be viewed as steering a high antenna gain towards the signal of interest, while simultaneously steering nulls towards potential interferers, thereby providing orthogonal channels to those SSs 10 that are assigned identical code sequences. The level of orthogonality that is achievable is controlled by the number of antenna elements in the antenna array 11A, the number of SDMA users in the channel, the amount of spatial separation of the users, the amount of multipath, and the level of the receiver noise floor. The effective antenna pattern is controlled by linearly combining the outputs of M receiving channels, as shown in the spatial filter 108 depicted in FIG. 6A. The output of the antenna array 11A for user n may be expressed in accordance with the equation shown in FIG. 6B, where $y_n(t)$ is the spatial filter 108 output, $w_{n,i}$ is the complex weight applied to the ith antenna element 100, $x_i(t)$ is the signal present on the ith channel, and * denotes complex conjugate. Each user applies a set of unique weights, thereby yielding different effective antenna beam patterns. This process is known as beamforming or as spatial filtering. Generally, in a SDMA/CDMA system, spatial filtering is performed prior to despreading by the CDMA code sequence. The conventional SDMA/CDMA receiver structure for the nth user is shown in FIG. 7, where $c_n$ denotes the code sequence for the nth user. In this case the complex multiplication operation performed in the spatial filter is computed at the sample rate of the system. Also, individual code despreaders are required for each user in the system.

However, in a S-CDMA system all of the users are code aligned. When SDMA is used as a multiple access technique in conjunction with S-CDMA, multiple users may share the same code sequence with identical alignment. In this case, it is possible to use a single despreader to despread the signals of all of the users having the common code sequence. This receiver structure is shown in FIG. 8. In this case a plurality of receiver antenna elements 100 and despreaders 102 operate on the plurality of received user signals, and corresponding accumulators 104 accumulate the despread signals over a bit duration. The outputs of the accumulators 104 are supplied over M-wide bus 106 to k spatial filter blocks 108. Each of the spatial filter blocks 108 contains the structure shown in FIG. 6A.

Providing an SDMA reuse factor of K requires a minimum of K antenna elements at the BS 11. Therefore, the preferred embodiment at least as many despreaders as would be needed with the conventional SDMA approach. However, by beamforming after despreading, the complex multiplies performed in the spatial filter 108 may now be applied at the symbol rate, as opposed to the sampling rate, as is required when beamforming is applied prior to despreading. The multiply operations involving the spatial filter weights require N bit by N bit multipliers. The multiplies involved in the despreader 102 may be computed using an exclusive-OR operation, since the code sequence is a binary sequence of −1's and 1's. Therefore, reducing the number of multiplies required to implement the spatial filter 108 far outweighs the overhead of adding additional despreaders to the system. Finally, due to the reduction in the multiplication rate it becomes possible to multiplex the use of the multiplier over several users, thereby reducing the amount of required hardware.

A first order approximation to the relative complexity of the two architectures may be obtained by comparing the number of complex multiplies per second for each type of system. Let N denote the total number of SDMA/CDMA users supported by the BS 11, and let $f_s$ denote the sampling frequency and $R_s$ denote the symbol rate. For the case of the conventional receiver, the number of complex multiplies per second is given by $MPS_{conventional}=MNf_s$, where M is the number of antenna elements in the array 11A. For the presently preferred receiver architecture the number of complex multiplies is given by $MPS_{preferred}=MNR_s$. Therefore, the preferred system architecture requires $R_s/f_s$ fewer complex multiplies than the conventional approach. For example, when P=128 and $R_o$=2, the preferred system architecture requires only 1/256 of the number of multiplies as the conventional architecture of FIG. 7.

Similar reductions in complexity are possible when applying SDMA to S-CDMA in the BS 11 transmitter. An embodiment of the BS 11 transmitter structure is shown in FIG. 9. When multiple users are present which have identical code sequences, the outputs of the individual spatial filter channels 108 may be combined prior to spreading. Therefore, only one set of spreaders 110 is required for each code sequence. Again, the spatial filter is applied at the symbol rate.

In order to continually adapt the forward link antenna weight vector, the SS 10 operates to continually estimate the path amplitude and phase from each of the m base station (BS) 11 antenna elements 100. The SS 10 sends the m channel estimates back to the BS 11. The path estimates to a single SS 10 are conveniently expressed as a complex signal vector known as the spatial signature vector, shown in FIG. 10, where $\alpha_i$ is the estimated path amplitude and $\phi_i$ is the estimated path phase in radians. From the estimated spatial signature vectors from all of the subscriber stations 10 that are sharing a code, the BS 11 computes the optimum weight vectors. For example, the weight vector that is to be used to transmit to a particular SS 10 may be found by solving the following set of linear equations, $$w^H v_1 = 1$$
$$w^H v_2 = 0$$
$$\vdots$$
$$w^H v_N = 0$$

where vi is the estimated spatial signature vector of the ith SS, and w is the complex column weight vector. In this manner the BS 11 is enabled to adapt the antenna beamforming operation to place nulls on interfering subscriber station(s) 10 and to maximize the signal to interference plus noise ratio for a signal transmitted from a desired SS 10.

While these teachings have been particularly shown and described with respect to preferred embodiments thereof, it will be understood by those skilled in the art that changes in form and details may be made therein without departing from the scope and spirit of the invention described above.

What is claimed is:

1. A method for operating a synchronous space division multiple access, code division multiple access communications system, comprising:

within a coverage area of a base station (BS), assigning the same spreading code to a plurality of subscriber stations (SSs); and beamforming using an antenna array at the BS so as to maximize a signal to interference plus noise ratio for a signal received from a desired SS by steering a null towards another same-code SS to minimize interference from the same-code SS, wherein the step of beamforming comprises receiving from the subscriber stations a spatial signature vector that is comprised of path amplitude and phase from each of m BS antenna elements, and where the BS, from the spatial signature vectors received from a plurality of same-code subscriber stations, computes antenna element weight vectors.

2. A method as in claim 1, wherein the antenna array has M-elements (M>1), wherein individual ones of P orthogonal spreading codes are reused aM times within the coverage area, where $1/M < a < 1$.

3. A method as in claim 1, wherein the step of beamforming comprises a step of despreading the signal received from the desired SS, followed by a step of spatial filtering.

4. A method as in claim 3, further comprising transmitting a message from the BS to a same-code SS by combining results of the spatial filtering for at least two same-code SSs followed by spreading the message and transmitting.

5. A synchronous space division multiple access, code division multiple access communications system, comprising a base station having a coverage area for a set of subscriber stations disposed within said coverage area, said base station comprising an adaptive antenna array for receiving transmissions from said set of subscriber stations and for transmitting signals to said set of subscriber stations, wherein a subset of subscriber stations comprises a plurality of subscriber stations that are assigned an identical spreading code, said base station comprising beamforming circuitry coupled to said adaptive antenna array for maximizing a signal to interference plus noise ratio for a signal transmitted from one of said subset subscriber stations by steering a null towards others of said subset of same code subscriber stations to minimize interference from the said others of said subset, wherein said beamforming circuitry comprises a despreader for despreading a signal received from said one of said subset and a spatial filter having an input coupled to an output of said despreader, and wherein said system has a maximum system capacity of aMP channels.

6. A system as in claim 5, wherein said antenna array comprises M-elements (M>1), wherein individual ones of P orthogonal spreading codes are reused aM times within the coverage area, where $1/M < a < 1$.

7. A synchronous space division multiple access, code division multiple access communications system, comprising a base station having a coverage area for a set of subscriber stations disposed within said coverage area, said base station comprising an adaptive antenna array for receiving transmissions from a set of subscriber stations and for transmitting signals to said set of subscriber stations, wherein a subset of subscriber stations comprises a plurality of subscriber stations that are assigned an identical spreading code, said base station comprising beamforming circuitry coupled to said adaptive antenna array for maximizing a signal to interference plus noise ratio for a signal received from one of said subset of subscriber stations by steering a null towards others of said subset of subscriber stations to minimize interference from the said others of said subset, wherein the BS receives from a plurality of the subset of subscriber stations a spatial signature vector that is comprised of path amplitude and phase from each of m BS antenna elements, and where said BS, from the spatial signature vectors received from a plurality of the subset of subscriber stations, computes antenna element weight vectors.

8. A system as in claim 7, wherein said beamforming circuitry comprises a despreader for despreading a signal received from said one of said subset and a spatial filter having an input coupled to an output of said despreader.

9. A synchronous space division multiple access, code division multiple access communications system, comprising a base station having a coverage area for a set of subscriber stations disposed within said coverage area, said base station comprising an adaptive antenna array for receiving transmissions from said set of subscriber stations and for transmitting signals to said set of subscriber stations, wherein a subset of subscriber stations comprises a plurality of subscriber stations that are assigned an identical spreading code, said base station comprising beamforming circuitry coupled to said adaptive antenna array for maximizing a signal to interference plus noise ratio for a signal received from one of said subset of subscriber stations by steering a null towards others of said subset of subscriber stations to minimize interference from the said others of said subset, wherein for a case of independent fading on each antenna element of said antenna array, said system achieves a diversity gain of M, where M is equal to the number of antenna elements of said antenna array.

* * * * *

UNITED STATES PATENT AND TRADEMARK OFFICE
CERTIFICATE OF CORRECTION

PATENT NO. : 7,054,292 B2
APPLICATION NO. : 09/833720
DATED : May 30, 2006
INVENTOR(S) : Hall et al.

It is certified that error appears in the above-identified patent and that said Letters Patent is hereby corrected as shown below:

In Claim 2: Column 17, line 22, "aM" should be deleted and -- $\alpha M$ -- should be inserted and Column 17, line 23, "1/M<a<1" should be deleted and -- $1/M<\alpha<1$ -- should be inserted.

In Claim 5: Column 17, line 52, "aMP" should be deleted and -- $\alpha MP$ -- should be inserted.

In Claim 6: Column 18, line 3, "aM" should be deleted and -- $\alpha M$ -- should be inserted and "aMP" should be deleted and -- $\alpha MP$ -- should be inserted.

Signed and Sealed this

Fifteenth Day of August, 2006

JON W. DUDAS
*Director of the United States Patent and Trademark Office*